(No Model.)
J. SCOTT.
MOLD FOR CURVING PLATE GLASS.
No. 417,097. Patented Dec. 10, 1889.
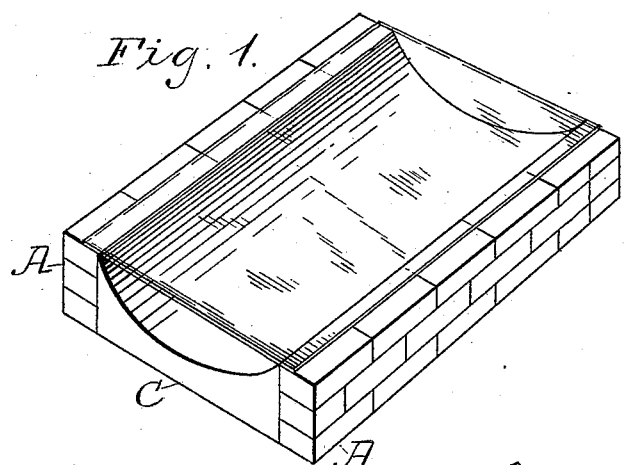
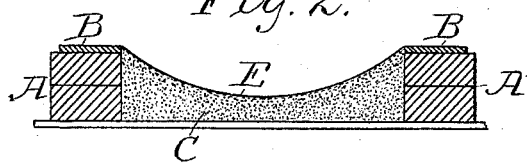
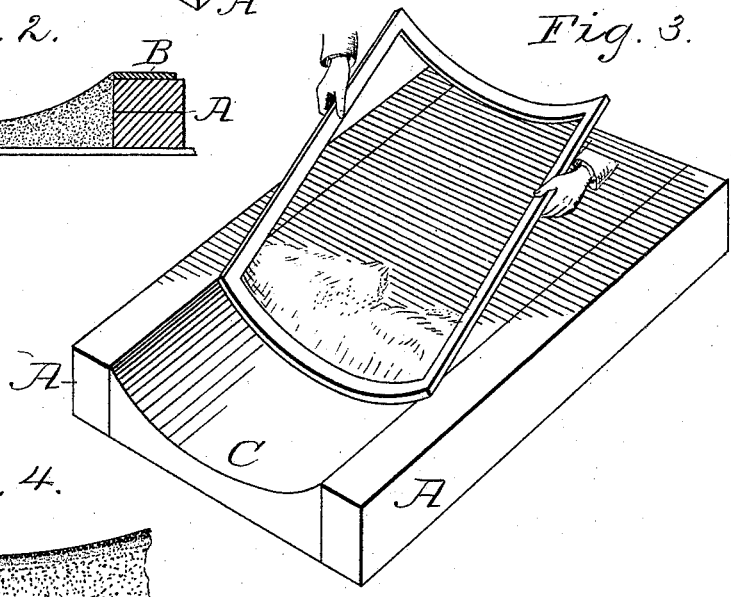
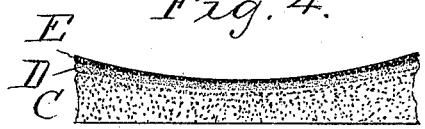
Witnesses
Louis S. Thomason.
John S. McClure
John Scott
Inventor
By his Attorney
Frank D. Thomason

UNITED STATES PATENT OFFICE.

JOHN SCOTT, OF ENGLEWOOD, ILLINOIS, ASSIGNOR OF ONE-FIFTH TO JAMES P. MALLETTE, OF SAME PLACE.

MOLD FOR CURVING PLATE-GLASS.

SPECIFICATION forming part of Letters Patent No. 417,097, dated December 10, 1889.

Application filed March 14, 1889. Serial No. 303,338. (No model.)

*To all whom it may concern:*

Be it known that I, JOHN SCOTT, of Englewood, Cook county, Illinois, have invented certain new and useful Improvements in Molds for Curving Plate-Glass, of which the following is a full, clear, and exact description, reference being had to the accompanying drawings, and to the letters of reference marked thereon.

Heretofore the molds used in the manufacture of curved plate-glass have been made of iron, and each mold was designed to produce a special curvature. Thus, as the curvature of plate-glass ordered by the trade is largely arbitrary, it is obvious that the production of it by such molds is slow, and expensive to both manufacturer and the trade.

The object of my invention is to produce a mold for making curved plate-glass, the material for which can be kept in large quantities in the manufactory, and which can be made in the shortest period of time possible and at but a small fraction of the expense heretofore considered necessary, substantially as hereinafter fully explained, and as illustrated in the drawings, in which—

Figure 1 is a perspective view of my improved mold with the glass in position before curving. Fig. 2 is a transverse vertical section therethrough. Fig. 3 is a perspective view showing the manner of its construction; and Fig. 4 shows, enlarged, a small portion of the mold.

Referring to the drawings, A A represent two walls of fire-brick placed perfectly parallel to each other just the distance apart it is desired the width of the curved plate should be, and of the same height. Placed longitudinally on top of said walls is a strip of bar metal B B, the inner longitudinal edges of which are immediately over and in the same vertical plane as the inner side of the same. Between these walls A is a bed of powdered plaster C or any other suitable powdered material which will not fuse when subjected to great heat, the upper surface of which is given a concave curvature corresponding to the curvature of the glass desired. Care must be taken, however, that the plane of this curvature just grazes the inner upper edge of the bars B, otherwise a longitudinal shoulder along both side edges of the plate would result after it had been curved, as will hereinafter more fully appear. When the desired curvature of the bed is obtained, a very thin coating of metal facing D may be given it, after which a thin coating of powdered charcoal E finishes the composite mold, as shown in Fig. 4.

The mold, as above described, is generally built on a metal platform, and when completed the plate of glass to be curved is placed so that its side edges rest upon the bars B. In this position, before it is fired and curved, it bridges over the concavity of the mold. When placed in the furnace and heated to the proper temperature, the plate of glass bends downward and conforms to the curvature of the molds, after which it is removed from the furnace and gradually cooled.

The metal facing D, before referred to, may consist of crushed iron ore, the same as is used by brass-foundries when an extra smooth casting is desired. While I prefer its use, however, I do not consider it as indispensable. The charcoal facing E prevents the discoloration of the glass by reason of contact with the plaster, which may contain foreign substances in it which would color the glass. Where, however, coarse glass, or glass the color of which would not cut much figure, is to be curved, the charcoal may be dispensed with.

Of course it will be fully appreciated that the mere mechanical details of my invention as described may be changed. For example, instead of brick wall A, they may be made of one length of tile, or even metal, and the inner edges of these walls may be so well defined and straight that the bars B may be dispensed with.

Now, to obtain the concave curvature of the mold, it is obvious it may be made by the expert use of the trowel. This, however, I deem too uncertain, and so have adopted a surer method, which is very well shown in Fig. 3. This consists simply of taking the window-sash, which is made and fitted first, and therefore has just the curvature desired, and (after the bed of plaster is placed and packed A to the plane of the upper edges thereof) moving its convex edge longitudinally between said walls until the surface of the plaster is scraped away to the right concavity. This or a similar method, as by scraping with a templet of metal or other stiff material, I much prefer.

In view of the fact that the bars B during the firing become heated before the glass does, and consequently because the glass is liable to, and frequently does, break under these circumstances, I deem it expedient to provide some interposing means between the glass and the said bars, which will serve as a non-conductor of heat to a certain extent and prevent that part of the glass becoming heated quicker than the remainder thereof. For this purpose I place compressed paper or thin sheets of wood veneer or other suitable material upon the bars under the glass. Thus the incineration of such paper or wood prevents heating contact of the metal bars with the glass and prevents effectually any breakage by reason of unequal heating of said glass.

What I claim as new is—

1. A mold for curving plate-glass, consisting of two parallel walls, a bed of powdered non-combustible material between said walls, the upper surface of which is curved concavely, as set forth.

2. A mold for curving plate-glass, consisting of two parallel walls and a bed of powdered non-combustible material between said walls, the upper surface of which is suitably concavely curved and has a metal facing given to it, as set forth.

3. A mold for curving plate-glass, consisting of two parallel walls and a bed of powdered non-combustible material between said walls, the upper surface of which is suitably concavely curved and has a charcoal facing, as set forth.

4. A mold for curving plate-glass, consisting of two parallel walls and a bed of powdered non-combustible material between said walls, the upper surface of which is suitably concavely curved and has first a metal facing and then a charcoal facing, as set forth.

5. A mold for curving plate-glass, consisting of two parallel walls, a strip of metal covering their top surface, and a bed of non-combustible powdered material placed between said walls, with its upper surface suitably curved, as set forth.

JOHN SCOTT.

Witnesses:
FRANK D. THOMASON,
J. S. McCLURE.